US010711674B2

(12) United States Patent
Clark et al.

(10) Patent No.: US 10,711,674 B2
(45) Date of Patent: Jul. 14, 2020

(54) PASSIVE NITROGEN OXIDE ADSORBER CATALYST

(71) Applicant: UMICORE AG & CO. KG, Hanau-Wolfgang (DE)

(72) Inventors: Davion Onuga Clark, Auburn Hills, MI (US); Christoph Hengst, Butzbach (DE)

(73) Assignee: UMICORE AG & CO. KG, Hunau-Wolfgang (DE)

( * ) Notice: Subject to any disclaimer, the term of this patent is extended or adjusted under 35 U.S.C. 154(b) by 0 days.

(21) Appl. No.: 15/789,174

(22) Filed: Oct. 20, 2017

(65) Prior Publication Data
US 2019/0120109 A1 Apr. 25, 2019

(51) Int. Cl.
*F01N 3/20* (2006.01)
*B01D 53/94* (2006.01)
*B01J 29/74* (2006.01)
*F01N 3/08* (2006.01)

(52) U.S. Cl.
CPC ....... *F01N 3/2026* (2013.01); *B01D 53/9418* (2013.01); *B01D 53/9431* (2013.01); *B01D 53/9481* (2013.01); *B01J 29/743* (2013.01); *B01J 29/7415* (2013.01); *F01N 3/0814* (2013.01); *F01N 3/0842* (2013.01); *F01N 3/2013* (2013.01); *F01N 3/2066* (2013.01); B01D 53/9477 (2013.01); B01D 2251/2062 (2013.01); B01D 2251/2067 (2013.01); B01D 2253/1085 (2013.01); B01D 2253/1122 (2013.01); B01D 2253/1124 (2013.01); B01D 2255/1023 (2013.01); B01D 2255/50 (2013.01); B01D 2255/502 (2013.01); B01D 2255/504 (2013.01); B01D 2255/9032 (2013.01); B01D 2255/91 (2013.01); B01D 2255/9207 (2013.01); F01N 2370/04 (2013.01); F01N 2510/068 (2013.01)

(58) Field of Classification Search
CPC .... F01N 3/2026; F01N 3/2066; F01N 3/0842; F01N 3/0814; F01N 2370/04
USPC .................. 422/168, 171, 177, 180
See application file for complete search history.

(56) References Cited

U.S. PATENT DOCUMENTS

| 6,709,644 | B2 | 3/2004 | Zones et al. | |
| 8,105,559 | B2* | 1/2012 | Melville | B01D 53/9409 423/213.2 |
| 8,617,474 | B2 | 12/2013 | Bull et al. | |
| 2009/0320457 | A1 | 12/2009 | Wan | |
| 2015/0158019 | A1* | 6/2015 | Rajaram | B01D 53/9481 423/213.2 |
| 2016/0045867 | A1* | 2/2016 | Kearl | B01J 20/06 423/213.2 |
| 2016/0333759 | A1* | 11/2016 | Di Nunno | F01N 3/2013 |
| 2017/0144105 | A1* | 5/2017 | Chandler | B01D 53/9418 |
| 2017/0183995 | A1 | 6/2017 | Utschig et al. | |
| 2017/0284250 | A1* | 10/2017 | Bergeal | F01N 3/0814 |

FOREIGN PATENT DOCUMENTS

| EP | 0885650 A2 | 12/1998 |
| WO | 2008/047170 A1 | 4/2008 |
| WO | 2008/106519 A1 | 9/2008 |
| WO | 2008/118434 A1 | 10/2008 |
| WO | 2008/132452 A2 | 11/2008 |
| WO | 2012/029050 A1 | 3/2012 |
| WO | 2012/071421 A2 | 5/2012 |
| WO | 2012/156883 A1 | 11/2012 |
| WO | 2012/166868 A1 | 12/2012 |
| WO | 2014/184568 A1 | 11/2014 |
| WO | 2015/085303 A1 | 6/2015 |
| WO | 2016/020351 A1 | 2/2016 |

OTHER PUBLICATIONS

Pfalzgraf, B., et al. The System Development of Electrically Heated Catalyst (EHC) for the LEV and EU-III Legislation, SAE Technical Paper 951072, 1995 (13 pgs).
Miyoshi, N., et al., Development of New Concept Three-Way Catalyst for Automotive Lean-Burn Engines, SAE Technical Paper 950809, 1995 (12 pages).
Mayer, T. Festoff-SCR-System auf Basis von Ammonium-Carbamat, Dissertation, Technical University of Kaiserslatern, Germany 2005 (157 pages).
Brück R., et al., "Innovative Catalyst Substrate Components for Future Passenger Car Diesel Aftertreatment Systems", 26th Aachen Colloquium Automobile and Engine Technology, "Presented" Oct. 11, 2017 (pp. 1075-1096).

* cited by examiner

*Primary Examiner* — Tom P Duong
(74) *Attorney, Agent, or Firm* — Smith, Gambrell & Russell, LLP

(57) ABSTRACT

The present invention relates to a catalyst comprising a carrier substrate of the length L, a passive nitrogen oxide adsorber and means to control the temperature of the carrier substrate, as well as a process for cleaning of an exhaust gas emitted from a lean burn engine.

23 Claims, No Drawings

PASSIVE NITROGEN OXIDE ADSORBER CATALYST

The present invention relates to a catalyst which comprises a passive nitrogen oxide adsorber (PNA) coated on a substrate that enables active temperature management of the catalyst.

The exhaust gas of motor vehicles that are operated with lean-burn combustion engines, such as diesel engines, also contain, in addition to carbon monoxide (CO) and nitrogen oxides (NOx), components that result from the incomplete combustion of the fuel in the combustion chamber of the cylinder. In addition to residual hydrocarbons (HC), which are usually also predominantly present in gaseous form, these include particle emissions, also referred to as "diesel soot" or "soot particles." These are complex agglomerates from predominantly carbonaceous particulate matter and an adhering liquid phase, which usually preponderantly consists of longer-chained hydrocarbon condensates. The liquid phase adhering to the solid components is also referred to as "Soluble Organic Fraction SOF" or "Volatile Organic Fraction VOF."

To clean these exhaust gases, the aforementioned components must be converted to harmless compounds as completely as possible. This is only possible with the use of suitable catalysts.

A known method for the removal of nitrogen oxides contained in exhaust gas in the presence of oxygen is the selective catalytic reduction with ammonia in the presence of an SCR catalyst. This method comprises conversion of nitrogen oxides to be removed from the exhaust gas with ammonia as reductant into nitrogen and water.

Suitable SCR catalysts are for example zeolites which are ion-exchanged with iron and in particular with copper, see for example WO2008/106519 A1, WO2008/118434 A1 and WO2008/132452 A2.

SCR catalysts for the conversion of nitrogen oxides with ammonia do not comprise noble metals, in particular no platinum. This is because in the presence of these metals the oxidation of ammonia with oxygen to nitrogen oxides would be preferred and the SCR reaction (conversion of ammonia with nitrogen oxide) would fall behind. In literature, some authors speak from platinum-exchanged "SCR catalysts". However, this doesn't refer to the $NH_3$-SCR-reaction but to the reduction of nitrogen oxides with hydrocarbons. As the selectivity of the latter reaction is very limited, it would be more correct to call it "HC-DeNOx-reaction" instead of "SCR reaction".

The ammonia used in the SCR reaction can be made available via feeding of an ammonia precursor, such as urea, ammonium carbamate or ammonium formate, into the exhaust gas line and subsequent hydrolysis.

SCR catalyst have the drawback that they are operable as of exhaust gas temperatures of about 180 to 200° C. only. Even if recent publications are stating that SCR catalysts can be active at as low as 150° C., it is still a problem to have them remove nitrogen oxides that are formed during the cold start period of the engine.

In addition to SCR catalysts, in order to remove nitrogen oxides so-called nitrogen oxide storage catalysts are known. For these catalysts the term "Lean NOx Trap," or LNT, is common. Their cleaning action is based upon the fact that in a lean operating phase of the engine, the nitrogen oxides are predominantly stored in the form of nitrates by the storage material of the storage catalyst, and the nitrates are broken down again in a subsequent rich operating phase of the engine, and the nitrogen oxides which are thereby released are converted with the reducing exhaust gas components in the storage catalyst to nitrogen, carbon dioxide, and water. This operating principle is described in, for example, SAE document SAE 950809.

As storage materials, oxides, carbonates, or hydroxides of magnesium, calcium, strontium, barium, alkali metals, rare-earth metals, or mixtures thereof come, in particular, into consideration. As a result of their alkaline properties, these compounds are able to form nitrates with the acidic nitrogen oxides of the exhaust gas and to store them in this way. They are deposited in the most highly dispersed form possible on suitable substrate materials in order to produce a large interaction surface with the exhaust gas. In addition, nitrogen oxide storage catalysts generally contain noble metals such as platinum, palladium, and/or rhodium as catalytically active components. It is their purpose, on the one hand, to oxidize NO to $NO_2$, as well as CO and HC to $CO_2$, and $H_2O$ under lean conditions and, on the other hand, to reduce released $NO_2$ to nitrogen during the rich operating phases, in which the nitrogen oxide storage catalyst is regenerated.

Modern nitrogen oxide storage catalysts are for example disclosed in EP0885650 A2, US2009/320457, WO2012/029050 A1 and WO2016/020351 A1.

The method described in SAE document SAE 950809, which comprises storing nitrogen oxides during a lean operating phase and releasing them in a subsequent rich operating phase, is also known as "active" nitrogen oxide storing method.

In addition, a method has been described which is known as "passive" nitrogen oxide storing method. This method comprises storing nitrogen oxides in a first temperature window and releasing them in a second temperature window where the second temperature window is at higher temperatures than the first temperature window. For carrying out this method passive nitrogen oxide adsorber catalysts are used, which are also known as PNA ("passive NOx-adsorber").

By means of passive $NO_x$-adsorbers, it is possible to store nitrogen oxides at temperatures, at which a SCR catalyst has not yet reached its operating temperature and to release them as soon as the SCR catalyst is operative. Accordingly, the intermediate storage of nitrogen oxides below for example 200° C. and their release above 200° C. results in an increased total conversion of nitrogen oxides of a combination of passive NOx-adsorber and SCR catalyst.

It is known from literature to use palladium supported on ceria as passive nitrogen oxide adsorber catalyst, see for example WO2008/047170 A1 and WO2014/184568 A1. According to WO2012/071421 A2 and WO2012/156883 A1 palladium on ceria can be coated on a particle filter as well.

WO2012/166868 A1 teaches to use a zeolite which comprises for example palladium and an additional metal, like for example iron, as passive nitrogen oxide adsorber catalyst.

WO2015/085303 A1 discloses passive nitrogen oxide adsorber catalysts, which comprise a noble metal and a small pore molecular sieve with a maximum ring size of eight tetrahedral atoms.

Ever tightening emission requirements for nitrogen oxides require development of new aftertreatment, engines, and systems control technologies. Of the aftertreatment technologies considered, nitrogen oxides adsorber catalysts are of high interest because they enable better cold start performance by storing the nitrogen oxides until a secondary aftertreatment device is warm enough to convert the nitrogen oxides catalytically. The concept of a passive nitrogen oxides adsorber catalyst is gaining widespread attention because it has an advantage over a fully formulated, "active"

nitrogen oxide adsorber catalyst because—as described above—it can be regenerated thermally during normal operation therefore minimizing any additional fuel penalty.

One of the significant challenges for effective operation of a passive nitrogen oxide adsorber catalyst is to synchronize the nitrogen oxide release with the time in which a downstream SCR catalyst is active and in which the temperature of the exhaust is warm enough for the dosed urea to hydrolyze to ammonia.

If release is too soon then nitrogen oxides will slip past the catalyst and out of the exhaust. If release is too late then the SCR catalyst may be overwhelmed with nitrogen oxides and not effectively reduce all of it, also resulting in nitrogen oxide slip.

In particular, passive nitrogen oxide adsorber technologies that use a palladium containing chabazite zeolite release nitrogen oxides at temperatures in excess of 250° C., due to a relatively strong Pd—NO bond. This results in the nitrogen oxide adsorber ending the drive cycle in a "fully loaded" condition and therefore not having capacity for nitrogen oxide storage on a subsequent cold start or cold operating condition when the SCR catalyst is no longer active. Hence, any nitrogen oxide created by the engine will slip out to the environment. Similarly, these same passive nitrogen oxide adsorber technologies are also challenged with SOx release.

Accordingly, in order to be most effective at managing nitrogen oxides, the passive nitrogen oxide adsorber catalyst should have a high nitrogen oxide trapping efficiency (e.g. 90%), good thermal durability, fast storage response and nitrogen oxide release characteristics that align with when the downstream SCR catalyst is active. In addition it should have the ability for desulfation at temperatures that do not result in severe thermal degradation.

It has now been found that the above described technical problems can be solved via an effective way to manage the temperature of the catalyst.

Accordingly, the present invention relates to a catalyst comprising a carrier substrate of the length L, a passive nitrogen oxide adsorber and means to control the temperature of the carrier substrate.

In an embodiment of the present invention, the passive nitrogen oxide adsorber comprises palladium which is supported on cerium oxide, zirconium oxide, a mixture of cerium and zirconium oxides or on a zeolite.

In case the palladium is supported on a zeolite, the zeolite is in particular a small pore zeolite belonging to a framework type having the framework type code AEI, AFX, CHA, ERI, KFI or LEV.

Zeolites of the framework type AEI are for example SSZ-39 and AIPO-18. A zeolite of the framework type AFX is for example SAPO-56. Zeolites of the framework type CHA are for example SSZ-13, SAPO-34, LZ-218, ZK-14 and chabazite. Zeolites of the framework type ERI are for example ZSM-34, LZ-220 and SAPO-17. A zeolite of the framework type KFI is for example ZK-5. Zeolites of the framework type LEV are for example Levyne, LZ-132, Nu-3, ZK-20 and SAPO-35.

Alternatively, the palladium can be supported on a zeolite belonging to the framework type having the framework type code BEA or MFI. Zeolites of the framework type BEA are in particular known as "zeolite beta" or "β zeolite". A zeolite of the framework type MFI is ZSM-5.

In case the palladium is supported on a zeolite, the zeolite is preferably chabazite, SSZ-13, zeolite beta or ZSM-5.

In case the palladium is supported on a zeolite, it is in particular present within the zeolite structure as palladium cation, i.e. in ion exchanged form. In addition, the palladium can completely or partly be present in form of palladium metal and/or in form of palladium oxide within the zeolite structure and/or on the surface of the zeolite structure.

Besides supporting palladium on a zeolite as described above it is also preferred to support it on cerium oxide.

The palladium can be present in an amount of 0.01 to 20 weight percent relative to the weight of the passive nitrogen oxide adsorber and calculated as palladium metal.

Preferably, palladium is present in an amount of 0.5 to 10, more preferably 0.5 to 4 and in particular preferably 0.5 to 2 weight percent relative to the weight of the passive nitrogen oxide adsorber and calculated as palladium metal.

In an embodiment of the present invention the carrier substrate of the length L is made of metal, like for example steel or alloys comprising iron, aluminum and chrome. However, the substrate of the length L can of course be made of cordierite as well.

Such carrier substrates preferably have a high cell density and a corresponding high catalytically effective surface.

In an embodiment, they are designed as flow through substrate where the channels which are open at both ends extend between the carrier's two end faces.

Preferably, carrier substrates made of metal are used which have the so-called LS-design (longitudinal structured), the so-called PE-design (perforated foils) or have a combination of both (LS-/PE-design). In these carrier structures the walls of the channels are perforated and the exhaust gas which entered a certain channel is mixed with exhaust gas which entered another channel. This results in turbulent flow conditions in the channel and thus to an increase of the mass transport to the wall onto which the passive nitrogen oxide adsorber is coated.

In another embodiment the carrier substrate is designed to trap soot. Carrier substrates made of metal are described in literature and available on the market.

In an embodiment of the present invention the means to control the temperature of the carrier substrate is at least one electrical heating element comprised of metal or ceramic. Usually, a resistive heating element is used but other heating elements can be used as well. The heating element ideally comprises means to control the rate of heating.

Such heating elements are described in literature and are available on the market. There are even carrier substrates made of metal available which comprise an integrated heating element. Such products are known as EHC—Electrically Heated Catalyst—(see for example SAE paper SAE 951072) and available on the market.

In an embodiment of the present invention the passive nitrogen oxide adsorber is present as a coating on the carrier substrate. In that case the coating can extend to the total length L of the carrier substrate or only to a part of it. In case an electrically heated catalyst (EHC) is used as carrier substrate the passive nitrogen oxide adsorber can even be coated directly on the heating element.

Also, the passive nitrogen oxide adsorber can be the sole coating on the carrier substrate or there can be one or more additional catalytically active coatings.

For example, the carrier substrate can carry an oxidation catalyst besides the passive nitrogen oxide adsorber.

The oxidation catalyst comprises for example platinum, palladium or platinum and palladium on a carrier material. In the latter case the weight ratio of platinum and palladium is for example 4:1 to 14:1.

As carrier material all materials can be used which are known to the skilled person for that purpose. Usually, they have a BET surface of 30 to 250 $m^2/g$, preferably of 100 to 200 $m^2/g$ (determined according to German standard DIN 66132) and are in particular alumina, silica, magnesia, titania, as well as mixtures or mixed oxides comprising at least two of these materials.

Preferred are alumina, alumina/silica mixed oxides and magnesia/alumina mixed oxides. In case alumina is used, it is preferably stabilized, for example with 1 to 6 weight percent, in particular 4 weight percent, of lanthana.

The coating comprising the passive nitrogen oxide adsorber (hereafter called coating A) and the coating comprising the oxidation catalyst (hereafter called coating B) can be arranged on the carrier substrate in different manner.

For example both coatings can extend to the complete length L of the carrier substrate or only to a part of it.

In one embodiment coating A extends starting from one end of the carrier substrate to 10 to 80% of the length L and coating B extends starting from the other end of the carrier substrate to 10 to 80% of the length L as well. In this case $L=L_A+L_B$ can apply, wherein $L_A$ is the length of coating A and $L_B$ is the length of coating B. However, it is also possible that $L<L_A+L_B$ applies. In this case coatings A and B overlap. Finally, $L>L_A+L_B$ can apply, if a part of the carrier substrate is free of any coating. In the latter case there is a gap between coatings A and B, which has a length of at least 0.5 cm, for example 0.5 to 1 cm.

It is also possible that both coatings A and B can extend to the complete length L of the carrier substrate. In this case coating B can be applied directly onto the carrier substrate and coating A onto coating B. Alternatively, coating A can be applied directly onto the carrier substrate and coating B onto coating A.

In addition it is possible that one coating extends to the complete length L of the carrier substrate and the other only to a part of it.

In a preferred embodiment of the present invention the coating comprising the passive nitrogen oxide adsorber is applied directly onto the carrier substrate and a coating comprising an oxidation catalyst is applied onto that coating, both extending to the complete length L of the carrier substrate.

In a particular preferred embodiment of the present invention a first coating comprising a zeolite selected from the group consisting of chabazite, SSZ-13, zeolite beta and ZSM-5 which is ion-exchanged with palladium in amount of 0.5 to 1.5 weight percent, relative to the passive nitrogen oxide adsorber and calculated as palladium metal, is coated onto a carrier substrate made of metal and a second coating comprising platinum, palladium or platinum and palladium in a weight ratio of 4:1 to 14:1 is applied onto the first coating, wherein both coatings extend to the complete length L of the carrier substrate.

In that case the lower layer is in particular present in an amount of 50 to 250 g/l carrier substrate and the upper layer in an amount of 50 to 100 g/l carrier substrate.

Catalysts according to the present invention wherein a passive nitrogen oxide adsorber is present as a coating on the carrier substrate can be manufactured by known methods, for example in accordance with the customary dip coating methods or pump and suck coating methods with subsequent thermal post-treatment (calcination and possibly reduction using forming gas or hydrogen). These methods are sufficiently known from the prior art.

The catalysts according to the present invention are outstandingly suitable as passive nitrogen oxide adsorbers. That means they are able to store nitrogen oxides at temperatures below 200° C. and to release them at temperatures above 200° C. In addition it is possible to manage its temperature so that it ends a drive cycle in an "empty" condition and therefore provides its full capacity for nitrogen oxide storage on a subsequent cold start or cold operating condition when the SCR catalyst is no longer active. Consequently, it is—in combination with a downstream SCR catalyst—possible to effectively convert nitrogen oxides within the complete temperature range, including cold start temperatures.

Accordingly, the present invention also relates to an exhaust gas cleaning system which comprises
 a catalyst comprising a carrier substrate of the length L, a passive nitrogen oxide adsorber and means to control the temperature of the carrier substrate, and
 a first SCR catalyst.

The first SCR catalyst of the inventive exhaust gas cleaning system can principally be selected from all catalysts which are active in catalyzing the SCR reaction of nitrogen oxides with ammonia. In particular the first SCR catalyst is selected from SCR catalysts being customary in the field of cleaning of automotive exhaust gas. That comprises SCR catalysts of the mixed oxide type, which for example comprise vanadium, tungsten and titanium, as well as catalysts on the basis of zeolites, in particular zeolites which are exchanged with transition metals, in particular with copper, iron or iron and copper.

In embodiments of the present invention the first SCR catalyst comprises small pore zeolites with a maximum ring size of eight tetrahedral atoms and a transition metal, for example copper, iron or copper and iron. Such SCR catalysts are for example disclosed in WO2008/106519 A1, WO2008/118434 A1 and WO2008/132452 A2.

In addition, large and medium pore sized zeolites which are exchanged with transition metals can be used as well. Of interest are in particular zeolites belonging to the structure code BEA.

In particular preferred zeolites belong to the structure codes BEA, AEI, CHA, KFI, ERI, LEV, MER or DDR and are in particular ion-exchanged with copper, iron or copper and iron.

Within the context of the present invention the term zeolites comprises molecular sieves which are sometimes called "zeolite-like". Molecular sieves are preferred if they belong to one of the above mentioned structure codes. Examples are silicaaluminumphosphate-zeolites, which are known as SAPO and aluminumphosphate-zeolites, which are known as AlPO. As well, these materials are in particular preferred if they are exchanged with copper, iron or iron and copper.

In addition, preferred zeolites have a SAR (silica-to-alumina ratio) value of 2 to 100, in particular 5 to 50.

The zeolites and molecular sieves, respectively, comprise transition metal in particular in an amount of 1 to 10 weight percent, preferred 2 to 5 weight percent, calculated as metal oxide, like for example $Fe_2O_3$ or CuO.

In preferred embodiments of the present exhaust gas cleaning system the first SCR catalyst comprises zeolites or molecular sieves of the Beta-type (BEA), Chabazite-type (CHA) or Levyne-type (LEV). Such zeolites or molecular sieves are for example known as ZSM-5, Beta, SSZ-13, SSZ-62, Nu-3, ZK-20, LZ-132, SAPO-34, SAPO-35, AlPO-34 and AlPO-35, see for example U.S. Pat. Nos. 6,709,644 and 8,617,474.

In an embodiment of the inventive exhaust gas cleaning system there is a dosing unit for reductant between the catalyst comprising a passive nitrogen oxide adsorber and the first SCR catalyst.

Suitable dosing units can be found in literature (see for example T. Mayer, Feststoff-SCR-System auf Basis von Ammonium-carbamat, Dissertation, Technical University of Kaiserslautern, Germany, 2005) and the skilled person can select any of them. The ammonia can be dosed into the exhaust gas flow as such or in form of a precursor which forms ammonia at the ambient conditions of the exhaust gas flow. Suitable precursors are for example aqueous solutions of urea or ammonium format, as well as solid ammonium carbamate. The reductant and its precursor, respectively, is usually carried in a storage tank which is connected to the dosing unit.

The first SCR catalyst is usually present in form of a coating on a carrier substrate, which may be a flow through or a wall flow substrate. The carrier substrate consists of for example silicon carbide, aluminum titanate or cordierite.

The inventive exhaust gas cleaning system optionally contains additional elements. For example, it can comprise a second SCR catalyst which can be located downstream of the first SCR catalyst or which can be located upstream of the catalyst comprising a passive nitrogen oxide adsorber in a closed-coupled position. The second SCR catalyst preferably comprises zeolites which are disclosed as being preferred for the first SCR catalyst above.

In addition, the inventive exhaust gas cleaning system can comprise a so-called ammonia slip catalyst (ASC). The purpose of an ammonia slip catalyst is to oxidize ammonia which breaks through an SCR catalyst and thus to avoid its release to atmosphere. Consequently, an ammonia slip catalyst is coated on a separate carrier substrate and located downstream of an SCR catalyst or it is coated on a downstream part of an SCR catalyst. In embodiments of the inventive exhaust gas cleaning system the ammonia slip catalyst comprises one or more platinum group metals, in particular platinum or platinum and palladium.

The inventive catalyst allows to align its nitrogen oxide release characteristics with when the downstream SCR catalyst is active.

Accordingly, the present invention relates to a process for cleaning exhaust gas emitted from a lean burn engine and containing nitrogen oxides, which process comprises contacting the exhaust gas stream with an exhaust gas cleaning system comprising a catalyst comprising a carrier substrate of the length L, a passive nitrogen oxide adsorber and means to control the temperature of the carrier substrate, and a first SCR catalyst thereby a) storing nitrogen oxides in the passive nitrogen oxide adsorber at temperatures lower than the operating temperature range of the first SCR catalyst b) releasing nitrogen oxides stored in step a) as soon as the first SCR catalyst has reached its operating temperature range by heating the carrier substrate and c) reducing the nitrogen oxides released in step b) in the first SCR catalyst.

EXAMPLE 1 a) A zeolite of the type SSZ-13 (framework type code CHA) is impregnated with 2% by weight of palladium using commercially available palladium nitrate ("incipient wetness"). The powder obtained is subsequently dried stepwise at 120 and 350° C. and finally calcined at 500° C.

b) The Pd-containing powder obtained in step a) above is suspended in demineralised water, mixed with 8% of a commercially available binder based on boehmite and milled in a ball mill. Subsequently, the washcoat obtained is coated on an electrically heated catalyst (EHC) made of metal (commercially available for example with the tradename EMICAT®) over its total length. The washcoat loading is 50 g/L, relative to the Pd-containing zeolite. This corresponds with a Pd-loading of 42.5 g/ft$^3$.

EXAMPLE 2

Example 1 is repeated with the difference that a zeolite of the framework typ BEA is used.

EXAMPLE 3

The catalyst obtained according to Example 1 is in an additional step coated over its total length with a washcoat comprising platinum supported on alumina. The washcoat loading of the additional step is 75 g/L, the platinum loading is 20 g/ft.

EXAMPLE 4

The catalyst obtained in Example 3 is combined with a second catalyst to form an exhaust gas cleaning system. The second catalyst is a commercially available flow through substrate made of cordierite which carries a zeolite of the framework typ CHA which is ion-exchanged with 3% by weight of copper (calculated as CuO). The washcoat loading of the second catalyst is 150 g/L.

The invention claimed is:

1. A catalyst comprising:
   a carrier substrate of length L,
   passive nitrogen oxide adsorber material supported on the carrier substrate; and
   a heating member that is positioned to heat the passive nitrogen oxide adsorber material at a time when exhaust flows over the passive nitrogen oxide adsorber material, wherein the heating member is a heating element supported on or integrated with the carrier substrate, and the passive nitrogen oxide adsorber material is a layer of passive nitrogen oxide adsorber material supported by the carrier substrate, and wherein the passive nitrogen oxide adsorber material is coated such that that the exhaust flow that is heated by the heating member travels over the passive nitrogen oxide adsorber material.

2. Catalyst according to claim 1, wherein the passive nitrogen oxide adsorber comprises palladium which is supported on cerium oxide, zirconium oxide, a mixture of cerium and zirconium oxides or on a zeolite.

3. Catalyst according to claim 2, wherein the palladium is supported on a zeolite and the zeolite is a small pore zeolite belonging to a framework type having the framework type code AEI, AFX, CHA, ERI, KFI or LEV or belongs to the framework type code BEA or MFI.

4. Catalyst according to claim 2, wherein palladium is supported on cerium oxide.

5. Catalyst according to claim 2, wherein palladium is present in an amount of 0.01 to 20 weight percent relative to the weight of the passive nitrogen oxide adsorber and calculated as palladium metal.

6. Catalyst according to claim 1, wherein the heating element is a resistive heating element.

7. Catalyst according to claim 1, wherein the carrier substrate of the length L is made of metal.

8. Catalyst according to claim 1, wherein the carrier substrate of the length L is an electrically heated catalyst (EHC).

9. Catalyst according to claim 8, wherein the passive nitrogen oxide adsorber is present as a coating over the full length of the carrier substrate of the length L.

10. Catalyst according to claim 9, wherein the carrier substrate of the length L comprises one or more catalytically active coatings besides the passive nitrogen oxide adsorber.

11. Catalyst according to claim 10, wherein the carrier substrate of the length L comprises an oxidation catalyst besides the passive nitrogen oxide adsorber.

12. Exhaust gas cleaning system which comprises
the catalyst of claim 1, and
a first SCR catalyst.

13. Exhaust gas cleaning system according to claim 12, wherein the first SCR catalyst comprises a small pore zeolite with a maximum ring size of eight tetrahedral atoms and a transition metal.

14. The exhaust gas cleaning system according to claim 13, wherein the transition metal is copper, iron or copper and iron.

15. Exhaust gas cleaning system according to claim 12, wherein the first SCR catalyst comprises a zeolite belonging to the structure code BEA, AEI, CHA, KFI, ERI, LEV, MER or DDR and which is ion-exchanged with copper, iron or copper and iron.

16. Exhaust gas cleaning system according to claim 12, which comprises a dosing unit for reductant between the catalyst comprising a passive nitrogen oxide adsorber and the first SCR catalyst.

17. Exhaust gas cleaning system according to claim 12, which comprises a second SCR catalyst which is located downstream of the first SCR catalyst or is located upstream of the catalyst comprising a passive nitrogen oxide adsorber in a closed-coupled position.

18. Exhaust gas cleaning system according to claim 12, which comprises an ammonia slip catalyst.

19. Process for cleaning of an exhaust gas emitted from a lean burn engine and containing nitrogen oxides, which process comprises contacting the exhaust gas stream with the exhaust gas cleaning system of claim 12.

20. The exhaust gas cleaning system according to claim 1, wherein the passive nitrogen oxide adsorber material is coated as to extend over a downstream side of the carrier support being heated.

21. A catalyst comprising:
a carrier substrate of length L,
passive nitrogen oxide adsorber material supported on the carrier substrate; and
a heating member that is positioned to heat the passive nitrogen oxide adsorber material at a time when exhaust flows Over the passive nitrogen oxide adsorber material, wherein the heating member is a heating element supported on or integrated with the carrier substrate, and the passive nitrogen oxide adsorber material is a layer of passive nitrogen oxide adsorber material supported by the carrier substrate, and wherein the passive nitrogen oxide adsorber material is coated as to extend over a downstream side of the carrier support being heated wherein the heating member is an electrically heated substrate of metal material and the passive nitrogen oxide adsorber material, which includes Pd-containing zeolite, is coated directly on the electrically heated substrate of metal material and over the full length of the heating member.

22. Catalyst according to claim 11, wherein the oxidation catalyst is applied over the passive nitrogen oxide adsorber material over the full length of L, and wherein the passive nitrogen oxide adsorber material includes Pd-containing zeolite and the oxidation catalyst comprises platinum.

23. A catalyst comprising:
a carrier substrate of axial length L,
passive nitrogen oxide adsorber material supported on the carrier substrate; and
a heating member that is positioned to heat the passive nitrogen oxide adsorber material at a time when exhaust flows over the passive nitrogen oxide adsorber material, wherein the heating member is a heating element integrated with the carrier substrate as to be located axially within length L of the carrier Substrate, and the passive nitrogen oxide adsorber material is a layer of passive nitrogen oxide adsorber material supported by the carrier substrate, and wherein the passive nitrogen oxide adsorber material is coated as to axially overlap the heating element as to provide for temperature control of the passive nitrogen oxide adsorber material at a time when exhaust flows over the passive nitrogen oxide adsorber material.

* * * * *